United States Patent
Van Amstel et al.

(10) Patent No.: US 10,250,697 B2
(45) Date of Patent: Apr. 2, 2019

(54) TOKEN BUCKET FLOW-RATE LIMITER

(71) Applicant: KALRAY, Orsay (FR)

(72) Inventors: Duco Van Amstel, Gieres (FR);
Alexandre Blampey, Sassenage (FR);
Benoit Dupont De Dinechin, Grenoble (FR)

(73) Assignee: KALRAY, Orsay (FR)

( * ) Notice: Subject to any disclaimer, the term of this patent is extended or adjusted under 35 U.S.C. 154(b) by 113 days.

(21) Appl. No.: 15/356,151

(22) Filed: Nov. 18, 2016

(65) Prior Publication Data
US 2017/0149908 A1 May 25, 2017

(30) Foreign Application Priority Data

Nov. 25, 2015 (FR) ..................... 15 61348

(51) Int. Cl.
| | | |
|---|---|---|
| H04L 29/08 | (2006.01) | |
| H04L 12/24 | (2006.01) | |
| H04L 12/28 | (2006.01) | |
| H04L 12/819 | (2013.01) | |
| H04L 12/26 | (2006.01) | |

(52) U.S. Cl.
CPC ........ *H04L 67/146* (2013.01); *H04L 41/0896* (2013.01); *H04L 43/0894* (2013.01); *H04L 47/215* (2013.01)

(58) Field of Classification Search
CPC ............... H04L 67/146; H04L 41/0896; H04L 43/0894

USPC .................................................. 370/235, 412
See application file for complete search history.

(56) References Cited

U.S. PATENT DOCUMENTS

| | | | | |
|---|---|---|---|---|
| 2004/0062259 | A1* | 4/2004 | Jeffries ................... | H04L 47/10 370/412 |
| 2008/0290954 | A1* | 11/2008 | Chambers ............ | H03K 23/486 331/18 |
| 2013/0070715 | A1* | 3/2013 | Nanda ..................... | H04L 47/15 370/329 |
| 2016/0285771 | A1* | 9/2016 | Kulkarni ............... | H04L 47/215 |

FOREIGN PATENT DOCUMENTS

WO 20090051533 A1 4/2009

OTHER PUBLICATIONS

French Preliminary Search Report, French Application No. 15 61348, dated Sep. 7, 2016, 6 pages.

* cited by examiner

*Primary Examiner* — Inder P Mehra

(57) ABSTRACT

A token bucket flow rate limiter is provided for a data transmission, comprising a token counter configured to be incremented at a rate determining the average flow rate of the transmission; a frequency divider connected to control incrementing of the token counter from a clock, the divider having an integer division factor; and a modulator configured to alternate the division factor between two different integers so as to make the resulting average flow rate tend to a programmed flow rate comprised between two boundary flow rates respectively corresponding to the two integers.

8 Claims, 3 Drawing Sheets

TOKEN BUCKET FLOW-RATE LIMITER

CROSS REFERENCE TO RELATED APPLICATIONS

The present application claims priority to French Patent Application No. 15 61348 filed on Nov. 25, 2015, which is incorporated herein by reference in its entirety.

TECHNICAL FIELD

The invention relates to networks on chip (NoC), and more particularly to so-called token bucket flow rate limiters that may be used to inject data flows into a NoC through its routers.

BACKGROUND

A token bucket flow rate regulator or limiter works as follows. A token counter, representing the bucket, is incremented at regular intervals. The token count saturates at a threshold (full bucket). When a data packet arrives, the packet size is compared with the token count in the bucket. If the token count is sufficient, the packet is sent and the corresponding tokens are removed from the bucket. Otherwise, the packet is discarded or waits for a sufficient token count to be reached.

Such a flow rate limiter can comply a data flow to a so-called σ-ρ (sigma-rho) profile. The ρ parameter corresponds to an average flow rate, often a normalized value between 0 and 1 expressing a fraction of the nominal bandwidth of the transmission link. This ρ parameter corresponds to the filling rate of the token bucket. The σ parameter, often referred to as "burstiness", expresses the flow rate irregularity tolerated during transmission. This parameter σ corresponds to the capacity of the bucket More specifically, packet size is usually expressed in flits (FLow digITs), a flit corresponding, for instance, to a word that can be transmitted in one cycle of a clock of the transmission link. Then, a flow conforming to a σ-ρ profile is such that the number of flits transmitted in any interval Δt is at most equal to ρ·Δt+σ. If the parameter ρ is a dimensionless value comprised between 0 and 1, the value Δt is the number of flits that can be transmitted continuously in the interval Δt, or simply the number of clock cycles contained in the interval Δt.

Incrementing the token counter is usually based on the transmission clock. Thus, incrementing the counter continuously, i.e. at each clock cycle, yields ρ=1. Dividing the clock frequency divides the incrementing frequency of the token counter, producing smaller values for ρ, for example ½, ⅓, ¼, ⅕, etc., for respective division factors of 2, 3, 4, 5 . . . .

The degree of adjustment thus obtained for parameter ρ may be insufficient in certain applications.

SUMMARY

A token bucket flow rate limiter for a data transmission is generally provided, comprising a token counter configured to be incremented at a rate determining the average flow rate of the transmission; a frequency divider connected to control incrementing of the token counter from a clock, the divider having an integer division factor; and a modulator configured to alternate the division factor between two different integers so as to make the resulting average flow rate tend to a programmed flow rate comprised between two flow rates respectively corresponding to the two integers.

The modulator may include an overflow counter connected to be incremented at the clock frequency by a fixed increment based on the difference between the programmed flow rate and the flow rate determined by a base division factor selected between the two integers, the overflow counter being connected to the divider to alternate the division ratio at each overflow.

The frequency divider may be configured to apply by default the smallest of the two integers as the division factor and transitorily increase the division factor at each overflow of the overflow counter.

The frequency divider may include an auxiliary counter connected to be incremented at the clock frequency and count up to the smallest of the two integers, the overflow counter being connected to make the auxiliary counter skip one increment at each overflow.

The programmed flow rate may be represented by a normalized flow rate between 0 and 1. The base division factor may then be chosen equal to the integer part of the ratio between the token counter increment and the normalized flow rate, and the increment of the overflow counter may be based on the fractional part of the ratio between the token counter increment and the normalized flow rate.

The increment of the overflow counter may be expressed by the relationship:

$$2^k\{c/\rho\}\cdot\rho/c$$

rounded to the lower or higher integer, where ρ is the normalized flow rate, c is the increment of the token counter, k is the number of bits of the overflow counter, and { . . . } designates a fractional part.

A method is also provided for limiting the flow rate of a data transmission based on a token bucket, comprising the steps of incrementing a token counter at consecutive intervals having durations that are variable between two discrete values that are multiples of the period of a clock; selecting the two discrete values according to a programmed flow rate; and applying the two discrete values to the token counter according to respective frequencies selected so that the average token counter incrementing rate corresponds to the programmed flow rate.

The method may comprise the steps of applying by default a first of the two discrete values for the incrementing interval of the token counter; incrementing an overflow counter at the frequency of the clock by an increment based on the difference between the programmed flow rate and the flow rate corresponding to the first discrete value; and transitorily applying to the token counter the second discrete value as the incrementing interval at each overflow of the overflow counter.

BRIEF DESCRIPTION OF THE DRAWINGS

Other advantages and features will become more clearly apparent from the following description of particular embodiments of the invention provided for exemplary purposes only and represented in the appended drawings, in which.

DETAILED DESCRIPTION

Figure 1:
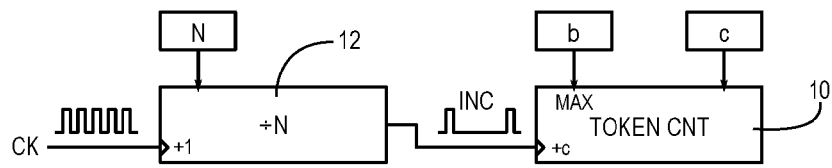
FIG. 1 is a block diagram of an exemplary token bucket flow limiter.

In FIG. 1, a token bucket flow rate limiter usually includes a token counter 10 connected to be incremented at the rate of pulses INC arriving at a clock input. The content of the token counter is limited to a maximum value defined by a parameter b, often programmed in a register. The increment to be applied may be an integer c at least equal to 1, programmable in another register. Thus, at each pulse INC, the content of counter 10 increases by value c, up to saturation at value b.

The pulses INC are supplied from a clock CK through a frequency divider 12. The division factor N may be programmed in a register. The divider 12 is generally in the form of a counter connected to be reset as soon as its content reaches N. Thus, the divider 12 produces a pulse INC every N pulses of clock CK.

Each time a data packet is available for transmission, the packet size is compared to the content of the counter 10. If the number of flits in the packet is at most equal to the content of the counter, the packet is transmitted and the counter is decremented by the size of the packet. Otherwise, the packet may be put on hold and the counter is not modified.

Such a flow limiter allows the programming of normalized rates by discrete values $\rho = c/N$, where N and c are integers such that $c \leq N$. If a fine adjustment granularity is desired between the programmable flow rates, N is chosen relatively large. However, when N is large, there is a correspondingly large time delay between two increments of the token counter, which increases latency in the packet transmission. A relatively high latency may be acceptable when the programmed rate is low (e.g. $c/N = 1/100$), but may be unacceptable when the programmed rate is high (e.g. $c/N = 99/100$, where increments of the token counter take place only once every 100 clock cycles).

Thus, for higher flow rates, it is desired that N be close to 1, which substantially reduces the granularity for $\rho$.

Figure 2:
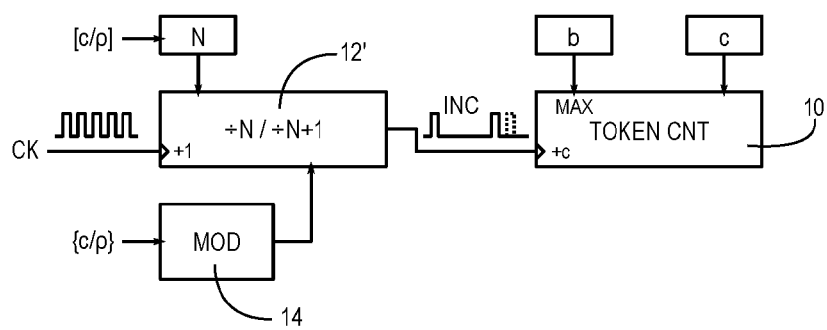
FIG. 2 is a block diagram of an embodiment of a flow limiter offering accurate adjustment.

FIG. 2 is a block diagram of an embodiment of a flow rate limiter that offers a fine granularity whatever the value programmed for flow rate $\rho$, and even allows programming a flow rate value $\rho$ that is not a ratio of integers.

The divider-by-N of the flow rate limiter of FIG. 1 is replaced by a fractional divider 12', configured for example to apply one or the other of two integer division factors, here consecutive integers N and N+1. The integer N may be the integer part of $c/\rho$, denoted $[c/\rho]$, whereby the flow rate determined by the sole factor N is greater than or equal to the programmed rate $\rho$, itself less than the flow rate determined by the sole factor N+1.

In general, instead of two consecutive integers N and N+1, any two distinct integers N1 and N2 may be used, chosen so that the programmed rate lies between the boundary rates determined by these two integers.

The divider 12' is controlled by a modulator 14 configured to select the division factor to apply for each increment based on the fractional part of $c/\rho$, denoted $\{c/\rho\}$. Here the modulation is such that the ratio between the frequency of use of factor N+1 and the number of increments tends to $\{c/\rho\}$, producing an increment rate of the token counter equal on average to the programmed flow rate.

A "modulation" is used, because it is sought to alternate the two division factors as much as possible, to smooth the token counter increments and the resulting actual flow rate. Such a modulator could be borrowed from phase locked loops or delta-sigma modulators, but these systems are complex in that they are designed to follow varying analog signals.

Figure 3:
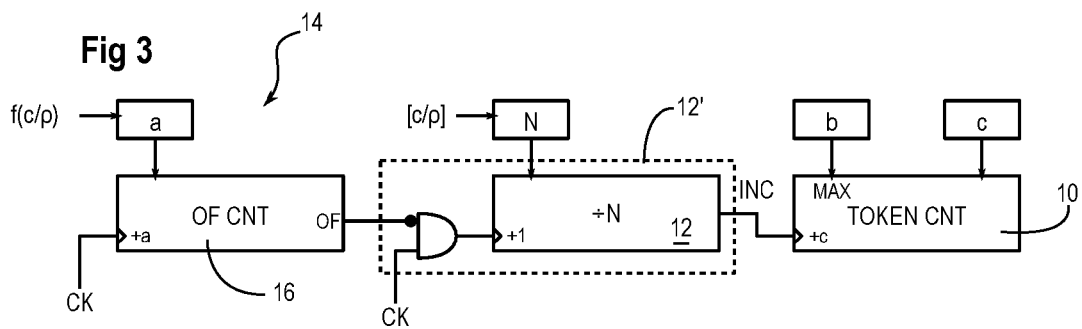
FIG. 3 is a block diagram of a detailed embodiment of a flow limiter based on the principle of FIG. 2.

FIG. 3 is a block-diagram of a flow rate limiter of the type of FIG. 2, illustrating in detail an example of a simple modulator satisfying the needs of the flow rate limiter. The modulator 14 comprises a counter 16 connected to be incremented at each clock cycle CK by an integer a, programmable in a register. Incrementing is achieved in an open loop, that is to say without controlling the counter overflow.

The counter 16 having a limited size, say k bits, its content varies modulo $2^k$. In other words, counter 16 regularly overflows to start counting anew, which is why it will be referred to hereunder as "overflow counter". If $2^k$ is divisible by a, the content of the counter 16 changes according to ramps having a period equal to $2^k/a$ clock cycles, starting at 0 and ending at $2^k - 1$. If $2^k$ if is not divisible by a, the content of counter 16 changes according to aperiodic ramps that start at a value between 0 and a−1, and end at a value between $2^k$ and $2^k - a - 1$.

The overflow events of the counter 16 are taken as a reference to produce the desired modulation. The counter 16 may be designed to produce a pulse OF at every overflow. Then the fractional divider 12' may be configured by default to apply the division factor N and to respond to each pulse OF to transitorily apply the division factor N+1.

The value of increment a thus determines the frequency of application of the factor N+1. To achieve the modulation sought here, the increment a is expressed by the equation:

$$2^k \{c/\rho\} \cdot \rho/c = 2^k (1 - [c/\rho] \cdot \rho/c)$$

rounded to the upper or lower integer value.

The fractional divider 12' may be realized, as shown, by a simple divider-by-N 12, whose clock input is preceded by an AND gate 18. One of the inputs of the AND gate receives the clock signal CK and the other input receives the complement of the overflow pulses OF. With this configuration, the AND gate is transparent to clock CK as long as the counter 16 does not overflow, causing division by N by default. At each overflow event, the AND gate 18 masks the current clock pulse CK from the input of divider 12. The divider skips the pulse. This divider typically being a counter, the counter freezes during one cycle, causing the delay of one cycle in the production of the next incrementing pulse INC for the token counter. In other words, the pulse INC is transitorily produced after N+1 cycles instead of N cycles.

FIGS. 4A to 4D are graphs illustrating this operation more clearly in the context of an example. In this example, for a packet size of 32 flits, the following values were used:

$\rho = 0.15$,
$b = \sigma = 58$,
$c = 1$,
$k = 8$, $2^k = 256$.

These settings produce the following values, calculated according to the previously mentioned equations:

$N = 6$,
$a = 25$.

Figure 4A:
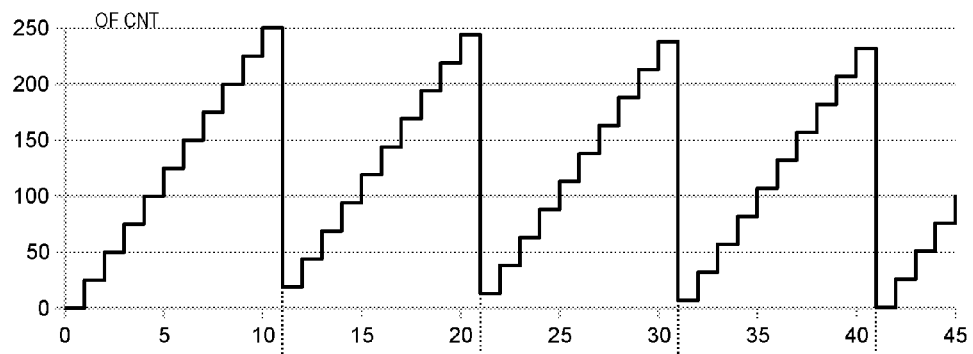
FIGS. 4A to 4D are graphs showing the evolution of counters of the flow limiter of FIG. 3, in the context of an example.

FIG. 4A shows the evolution of the overflow counter 16. This counter freewheels and the first overflows occur in cycles 12, 22, 32 and 42.

Figure 4B:
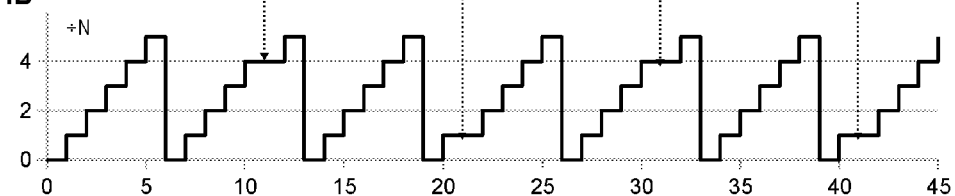

FIG. 4B shows the evolution of a counter embodying the divider 12, here a divider by six. If the divider 12 operated in freewheel mode, it would produce periodic ramps of 6 clock cycles and an amplitude of 5, like the first ramp shown. At the times when the counter 16 (FIG. 4A) overflows, as identified by vertical lines, the counter 12 freezes during one clock cycle. Thus, the counter 12 remains at 4 during both cycles 11 and 12, remains at 1 during both cycles 21 and 22, remains at 4 during both cycles 31 and 32, and remains at 1 during both cycles 41 and 42.

It follows that a division factor of seven (6+1) is applied to the second, fourth, fifth, and seventh ramps of FIG. 4B. As soon as these first cycles, it can be noted that for 7 increments of the token counter, 4 were achieved over an interval of 7 cycles, and 3 were achieved over an interval of 6 cycles, resulting in an average interval of 6.57 cycles. This value is already close to the programmed interval of 1/0.15=6.67, and will get even closer over time.

Figure 4C:
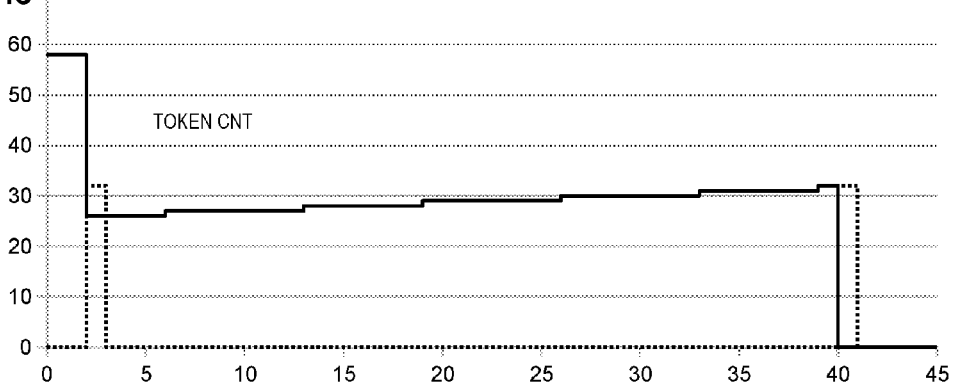

FIG. 4C shows in bold line the evolution of token counter 10, set up with b=58, assuming a first packet of 32 flits becomes available for transmission in cycle 2.

Figure 4D:
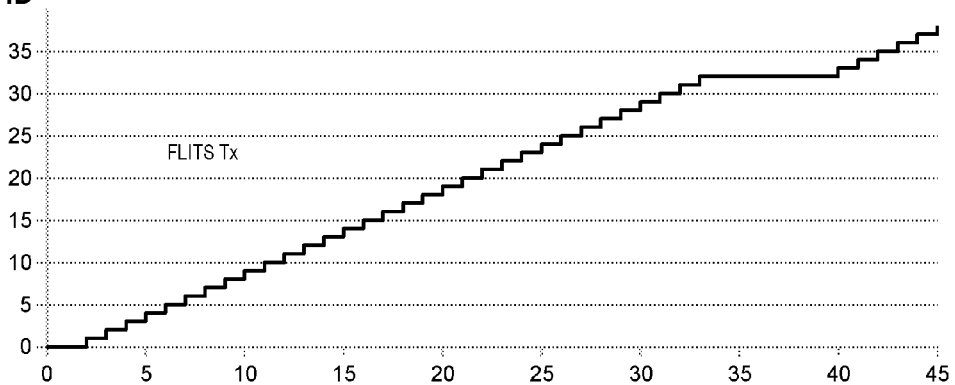

FIG. 4D, to which reference will be made at the same time as FIG. 4C, shows the accumulated transmitted flits.

The packet transmission starts at cycle 3, as the token counter is decremented by 32, these operations being identified by a pulse in dashed line having the packet size as amplitude.

The token counter is then incremented by one in each of the cycles 6, 13, 19, 26, 33, 39 . . . defined by the divider (FIG. 4B).

The last flit of the first packet is transmitted in cycle 33. It is assumed that a new packet is available as of cycle 34, but the token counter contains 31, insufficient units to transmit the packet. The transmission of the new packet starts at cycle 40, after the token counter has reached 32 at cycle 39.

Figure 5:
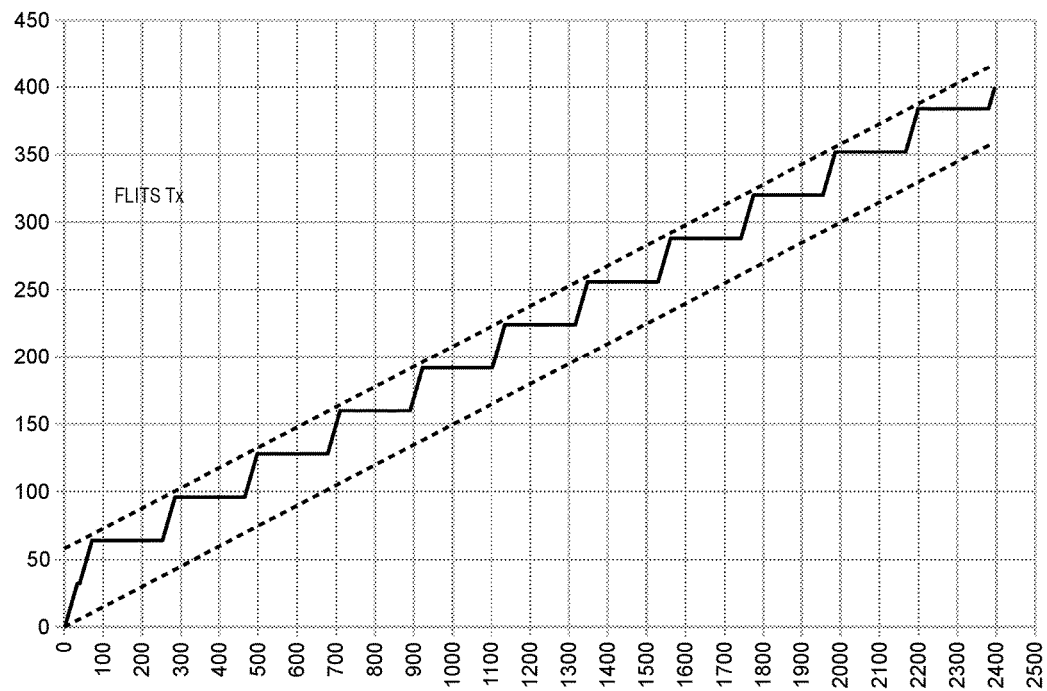
FIG. 5 is a graph showing a long-term trend of the amount of data transmitted in the context of the example of FIG. 4.

FIG. 5 is a long-term extension, over 2,500 cycles, of the graph of FIG. 4C, assuming that packets are continuously available for transmission. The dashed straight lines represent boundaries for the evolution of the accumulated transmitted flits complying with a σ-ρ profile.

The lower boundary line is defined by y=ρt=0.15t, where t is the time in number of clock cycles.

The upper boundary line is defined by y=ρt+σ=0.15t+58.

These boundary lines are defined according to the exact programmed value of ρ. It shall be noted that the accumulated transmitted flits fully respect these boundaries, although 1/ρ is not an integer.

The resolution with which the flow rate ρ can be programmed depends on the size k of the overflow counter, N, and c. More specifically, it is equal to 2−kc/N for $N<2^k$. When N is greater than $2^k$, the increment a is always zero and the resolution is c/(N (N+1)).

Figure 6:
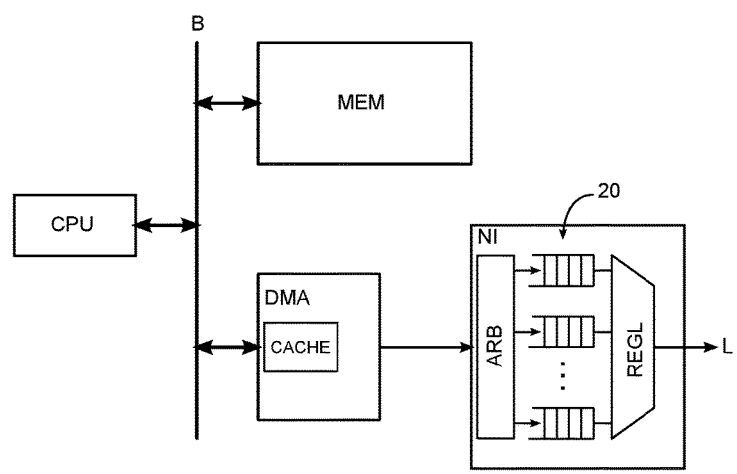
FIG. 6 schematically shows a system for transmitting multiple competing data flows on a shared network link, in which flow limiters can be implemented.

FIG. 6 schematically shows an example of a system for transmitting multiple competing flows over a shared network link L, as discussed in US patent application 2014-0301206. Several flow rate limiters as described herein may be used in such a system.

The system includes a CPU, a memory MEM, and a direct memory access circuit DMA, interconnected by a system bus B. A network interface NI is connected receive data through the DMA circuit and to send the data over the network link L. This network interface includes a plurality of queues 20, for example eight, each of which may be associated with a different connection, or virtual channel, or more generally a different transmission session.

An arbiter ARB may be provided to manage the filling of the queues, for example using weighted fair queuing (WFQ). The writing of the queues to the network link L is managed by a flow regulator REG. This regulator may include a flow rate limiter for each queue, the parameters of which are programmed by the processor upon powering-on the system. The flow rate limiters may be configured so that each is enabled in turn in a round-robin fashion. The active limiter then transmits packets taken from its queue until the token counter is exhausted or the queue is empty.

Many variations and modifications of the embodiments described herein will be apparent to the skilled person. For example, although a fractional divider was disclosed that operates by default with the smallest division factor (N) and is transitorily controlled by the modulator to apply the higher division factor (N+1), a reciprocal configuration may be used, where the divider operates by default with the higher division factor (N+1) and where this factor is transitorily switched to the smaller factor (N) by the modulator. In this case, the value 1−{c/ρ} may be used instead of {c/ρ} in the various disclosed equations.

What is claimed is:

1. A token bucket flow rate limiter for data transmission, comprising:
   a token counter configured to be incremented at a rate determining the average flow rate of the transmission;
   a frequency divider connected to control incrementing of the token counter from a clock, the divider having an integer division factor; and
   a modulator configured to alternate the division factor between two different integers so that the resulting average flow rate tends to a programmed flow rate comprised between two boundary flow rates respectively corresponding to the two integers.

2. The flow rate limiter of claim 1, wherein the modulator comprises an overflow counter connected to be incremented at the clock frequency by a fixed increment based on the difference between the programmed flow rate and the flow rate determined by a base division factor selected between the two integers, the overflow counter being connected to the divider to alternate the division ratio at each overflow.

3. The flow rate limiter of claim 2, wherein the frequency divider is configured to apply by default the smallest of the two integers as the division factor and transitorily increase the division factor at each overflow of the overflow counter.

4. The flow rate limiter of claim 3, wherein the frequency divider comprises an auxiliary counter connected to be incremented at the clock frequency and count up to the smallest of the two integers, the overflow counter being connected to make the auxiliary counter skip one increment at each overflow.

5. The flow rate limiter of claim 2, wherein:
   the programmed flow rate is represented by a normalized flow rate between 0 and 1,
   the base division factor is chosen equal to the integer part of the ratio between the token counter increment and the normalized flow rate, and
   the increment of the overflow counter is based on the fractional part of the ratio between the token counter increment and the normalized flow rate.

6. The flow rate limiter of claim 5, wherein the increment of the overflow counter is expressed by the relationship:

$$2^k\{c/\rho\}\cdot\rho/c$$

rounded to the lower or higher integer, where ρ is the normalized flow rate, c is the increment of the token counter, k is the number of bits of the overflow counter, and {. . .} designates a fractional part.

7. A method of limiting the flow rate of a data transmission based on a token bucket, comprising the steps of:
incrementing a token counter at consecutive intervals having durations that are variable between two discrete values that are multiples of the period of a clock;
selecting the two discrete values according to a programmed flow rate; and
applying the two discrete values to the token counter according to respective frequencies selected so that the average token counter incrementing rate corresponds to the programmed flow rate.

8. The method of claim 7, comprising the steps of:
applying by default a first of the two discrete values for the incrementing interval of the token counter;
incrementing an overflow counter at the frequency of the clock by an increment based on the difference between the programmed flow rate and the flow rate corresponding to the first discrete value; and
transitorily applying to the token counter the second discrete value as the incrementing interval at each overflow of the overflow counter.

* * * * *